US007239593B2

(12) United States Patent
Abe (10) Patent No.: US 7,239,593 B2
(45) Date of Patent: Jul. 3, 2007

(54) MAGNETIC DISK DEVICE AND ELECTRONIC APPARATUS FOR MOUNTING THE MAGNETIC DISK DEVICE THERETO

(75) Inventor: Wataru Abe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 79 days.

(21) Appl. No.: 10/817,598

(22) Filed: Apr. 2, 2004

(65) Prior Publication Data

US 2005/0013038 A1    Jan. 20, 2005

(30) Foreign Application Priority Data

Apr. 3, 2003  (JP)  ............... 2003-099919

(51) Int. Cl.
*G11B 17/00* (2006.01)
*G06F 1/16* (2006.01)

(52) U.S. Cl. ............... 369/75.11; 360/98.01; 360/137; 360/97.01; 369/77.21; 361/685

(58) Field of Classification Search ............ 361/685, 361/683, 684, 686; 360/97.01, 98.01, 78.01, 360/137; 369/75.11–82
See application file for complete search history.

(56) References Cited

U.S. PATENT DOCUMENTS 5,155,663 A * 10/1992 Harase ............ 361/684
5,587,854 A * 12/1996 Sato et al. ............ 360/97.01
5,612,927 A * 3/1997 Morrison et al. ........ 361/685
5,889,649 A * 3/1999 Nabetani et al. ........ 361/684
6,166,901 A   12/2000 Gamble et al.
6,252,765 B1 * 6/2001 Balzaretti et al. ........ 361/683

FOREIGN PATENT DOCUMENTS

JP       06-176555    6/1994
WO       WO 99/06902  2/1999

* cited by examiner

Primary Examiner—Lisa Lea-Edmonds
(74) Attorney, Agent, or Firm—Brinks Hofer Gilson & Lione (57) ABSTRACT

A magnetic disk device is removable from an apparatus body includes a case, a driving unit, and a connector. The driving unit is installed in the case, and includes a magnetic disk and a rotary driver for rotationally driving the magnetic disk. The connector connects the driving unit and the apparatus body. The case includes an elastic supporting member and a locking member. The elastic supporting member elastically supports the driving unit. The locking member is movable between a locked position and an unlocked position, the driving unit being locked at the locked position and being unlocked at the unlocked position in the case. The locking member moves to the locked position and the unlocked position by operational force from the exterior of the case.

27 Claims, 4 Drawing Sheets

MAGNETIC DISK DEVICE AND ELECTRONIC APPARATUS FOR MOUNTING THE MAGNETIC DISK DEVICE THERETO

BACKGROUND OF THE INVENTION

1. Field of the Invention

The present invention relates to a magnetic disk device that incorporates a driving unit for driving a magnetic disk and can be mounted to and removed from the body of an apparatus, and an electronic apparatus including the magnetic disk device and a body for mounting the magnetic disk device thereto.

2. Description of the Related Art

A removable magnetic disk device that can be mounted to and removed from the body of various apparatuses is one type of magnetic disk device usable in, for example, a vehicle-installed electronic apparatus, an information appliance, or a video recorder. This type of magnetic disk device is disclosed in Japanese Unexamined Patent Application Publication No. 6-176555 and PCT Japanese Translation Patent Publication No. 2001-502103.

In this type of magnetic disk device, a hard disk is mounted as a recording medium in a case formed of a hard metal or synthetic resin. In addition, a rotary driver for rotationally driving the hard disk, a magnetic head unit for recording digital signals onto the hard disk and reproducing the digital signals recorded on the hard disk, a control circuit for controlling driving operations of the rotary driver and the magnetic head unit, a digital signal processing circuit, an interface circuit, etc., are mounted in the case.

The case has a predetermined thickness and a rectangular shape. Connector means connected to the various circuits is disposed at the front portion of the case.

A connector for connecting with the connector means is disposed at the body of an apparatus. The various circuits in the case and circuits of the body of the apparatus are connected by mounting the magnetic disk device to the body of the apparatus and fitting the connector means at the case to the body connector.

Unlike a related magnetic disk device that has a hard disk mounted thereto and is fixed in a computer or various information apparatuses, the removable magnetic disk device can be removed from the body of the apparatus. Therefore, the removed magnetic disk device needs to be protected from shock that is produced, for example, when it is dropped.

As disclosed in the aforementioned Japanese Unexamined Patent Application Publication No. 6-176555 and PCT Japanese Translation Patent Publication No. 2001-502103, a dampener is installed in the case of the magnetic disk device in order to protect the rotary driver and the magnetic head unit from shock produced, for example, when the magnetic disk device is dropped.

In the removable magnetic disk device, the use of a soft elastic member having a low elastic modulus is used as the dampener for protecting the rotary driver and the magnetic head unit in the case may increase the error rate of the recording operation and that of the reproducing operation.

In a magnetic disk device used for high recording density, the recording track density of the hard disk is high, the recording/reproduction track width of the magnetic head is small, and the linear recording density along the tracks is high. In this type of magnetic disk device, in order to prevent damage to a recording surface of the hard disk, sliding friction force between a magnet head chip and the recording surface of the hard disk is reduced by forming an air bearing between the magnetic head chip and the recording surface of the hard disk.

In recording information onto and reproducing the information from the hard disk, the magnetic head chip carries out a very precise operation. That is, it searches for a sector in a recording area of the hard disk at a high speed, and instantaneously performs tracking of tracks in the searched sector.

Therefore, when the rotary driver and the magnetic head unit are supported by a soft elastic member in the case, the hard disk and the magnetic head unit tend to move due to vibration generated when the magnetic head unit performs the aforementioned searching operation. When this occurs, the spacing between the magnetic head chip and the surface of the hard disk changes to a value equal to or greater than a standard value, and the tracking operation is affected. As a result, the error rates of data recorded on the hard disk and of data reproduced from the hard disk are increased.

Consequently, it is necessary to use a hard dampener having a high elastic modulus for the dampener disposed in the case of the magnetic disk device. However, such a hard dampener cannot sufficiently protect the components in the case. As a result, a large shock applied to the magnetic disk device when, for example, it is dropped by mistake tends to result in, for example, scratching of a surface of the hard disk or damage to the magnetic head chip.

SUMMARY OF THE INVENTION

Accordingly, it is a first object of the present invention to provide a magnetic disk device that sufficiently protects a hard disk and a magnetic head unit in a case from, for example, external shock when the magnetic disk device is not mounted to the body of an apparatus, and to prevent a dampener from adversely affecting the magnetic disk device when the magnetic disk device is mounted to the body of the apparatus. A second object of the present invention is to provide an electronic apparatus for mounting the magnetic disk device thereto.

According to one embodiment of the present invention, there is provided a magnetic disk device removable from an apparatus body. The magnetic disk device comprises a case including an elastic supporting member and a locking member; a driving unit including a magnetic disk and a rotary driver for rotationally driving the magnetic disk, the driving unit being installed in the case; and a connector for connecting the driving unit and the apparatus body. The elastic supporting member elastically supports the driving unit. The locking member is movable between a lock position and an unlock position, the driving unit being locked at the lock position and being unlocked at the unlock position in the case. In addition, the locking member moves to the lock position and the unlock position by operational force from the exterior of the case.

According to another embodiment of the present invention, there is provided an electronic apparatus comprising a body for mounting the magnetic disk device thereto. The body comprises a body connector for connecting with the connector of the magnetic disk device, and a switching unit for moving the locking member to the lock position when the magnetic disk device is mounted.

When the magnetic disk device is removed from the body of the apparatus, the driving unit is set in an elastically supported state in the case by externally operating the locking member, thereby protecting the magnetic disk device from external shock. Immediately before mounting the magnetic disk device to the body of the apparatus or after mounting it to the body of the apparatus, the driving unit is locked in the case by operating the locking member in order to restrict unnecessary movement of the hard disk and the magnetic head unit when performing a recording operation or a reproducing operation, thereby making it possible to reduce error rate.

In the magnetic disk device and the electronic apparatus for mounting the magnetic disk device in a preferred embodiment of the present invention, the locking member may be moved to the lock position and the unlock position by operation of the locking member by a user with his/her finger or by the switching unit disposed at the body of the apparatus.

For example, a structure may be used in which the locking member reaches the unlock position by moving towards a front portion of the magnetic disk device relative to the case, and reaches the lock position by moving towards a rear portion of the magnetic disk device relative to the case, the front portion corresponding to a side of the magnetic disk device where the connector is disposed and the rear portion corresponding to a side opposite thereto.

By virtue of such a structure, it is possible to move the locking member to the lock position by making use of mounting force is produced when the magnetic disk device is mounted.

The locking member may be biased in the direction of the unlock position by a biasing member.

By virtue of such a structure, the driving unit is unlocked by operating the locking member by biasing force of the biasing member, such as a spring, when the magnetic disk device is not mounted to the body of the apparatus. In addition, the driving unit may be locked by moving the locking member to the lock position against the biasing force of the biasing member when the magnetic disk device is mounted to the body of the apparatus.

DESCRIPTION OF THE PREFERRED EMBODIMENTS

Figure 1:
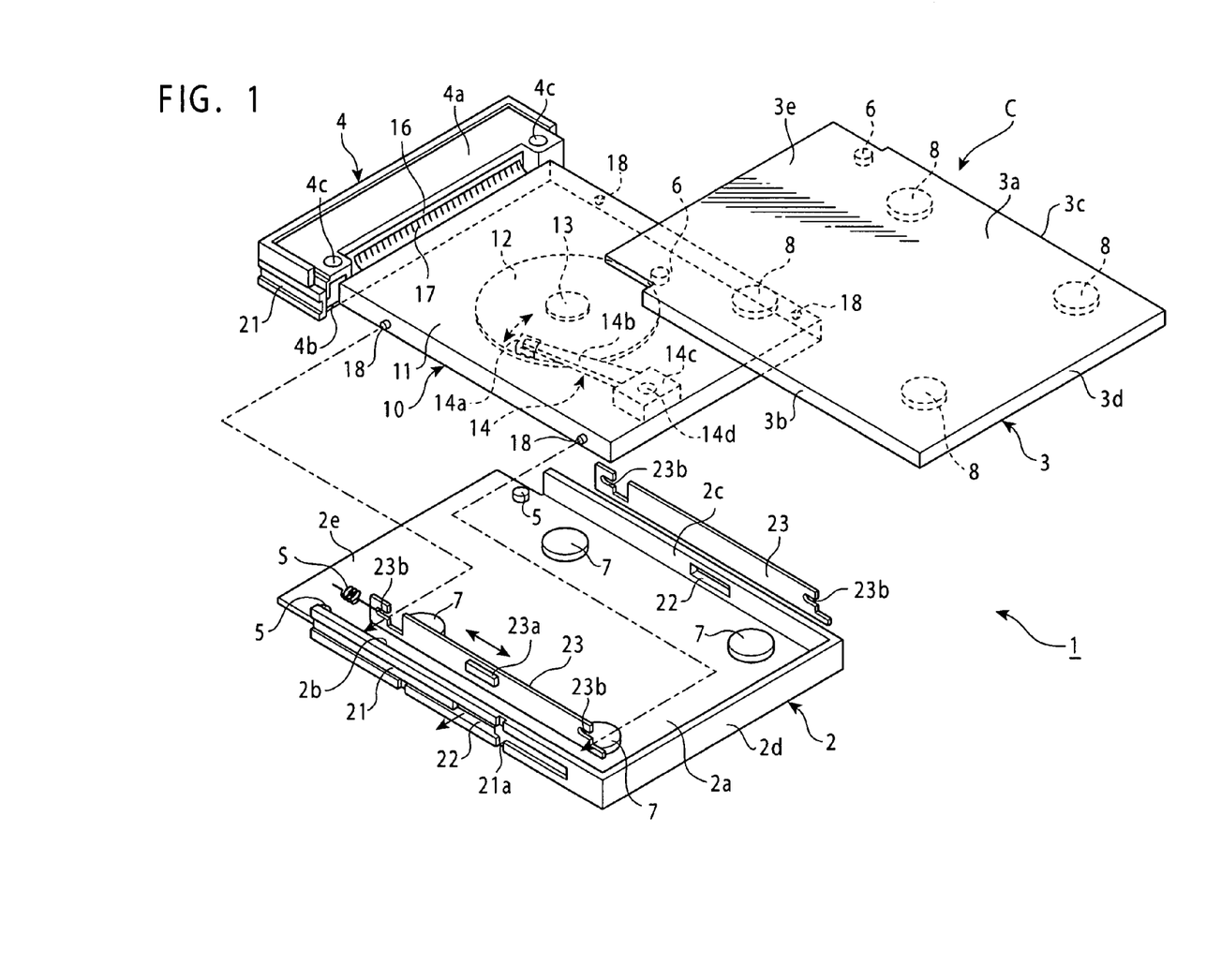
FIG. 1 is an exploded perspective view of a magnetic disk device according to an embodiment of the present invention.

A magnetic disk device 1 shown in FIG. 1 comprises a lower case portion 2, an upper case portion 3, and a connector case portion 4. Each case portion is injection molded out of synthetic resin. The lower case portion 2 comprises a bottom surface 2a, a left surface 2b, a right surface 2c, and a rear surface 2d; has a rectangular shape; and has a recess. The front portion of the bottom surface 2a is formed as a fitting portion 2e having a somewhat smaller width. The upper case portion 3 comprises a ceiling surface 3a, a left frame 3b, a right frame 3c, and a rear frame 3d; has a rectangular shape; and has a shallow recess. The front portion of the ceiling surface 3a is formed as a fitting portion 3e having a somewhat smaller width.

The connector case portion 4 comprises a fitting recess 4a at its upper surface and a fitting recess 4b at its lower surface. The connector case portion 4 has positioning holes 4c and 4c passing through the fitting recess 4a and the fitting recess 4b. A pair of upwardly protruding positioning protrusions 5 and 5 are formed on the front portion of the bottom surface 2a of the lower case portion 2. A pair of downwardly protruding positioning protrusions 6 and 6 are formed on the front portion of the ceiling surface 3a of the upper case portion 3.

When the fitting portion 2e of the lower case portion 2 is fitted to the fitting recess 4b of the connector case portion 4, and the fitting portion 3e of the upper case portion 3 is fitted to the fitting recess 4a of the connector case portion 4, the positioning protrusions 5 and 5 on the lower case portion 2 and the positioning protrusions 6 and 6 on the upper case portion 3 are vertically fitted to the positioning holes 4c and 4c, so that the lower case portion 2, the upper case portion 3, and the connector case portion 4 are combined, thereby forming a rectangular case C having a hollow interior. The lower case portion 2 and the upper case portion 3 are secured by, for example, screws.

A rectangular driving unit 10 is installed in the case C. The volume of the driving unit 10 is smaller than the volume of the space in the case C that is formed when the lower case portion 2 and the upper case portion 3 are combined. Spaces are formed between the driving unit 10 and the bottom surface 2a, the ceiling surface 3a, the left surface 2b, the right surface 2c, and the connector case portion 4, respectively.

A plurality of elastic supporting members 7 are disposed between the bottom surface 2a of the lower case portion 2 and the driving unit 10. A plurality of elastic supporting members 8 are similarly disposed between the ceiling surface 3a of the upper case portion 3 and the driving unit 10. It is desirable that elastic supporting members are disposed between the driving unit 10 and the left surface 2b of the lower case portion 2, the driving unit 10 and the right surface 2c of the lower case portion 2, and between the driving unit 10 and the rear surface 2d of the lower case portion 2.

Each elastic supporting member 7 and each elastic supporting member 8 is formed of soft synthetic rubber having a low elastic modulus, such as butyl rubber or silicone rubber, and is, desirably, formed of viscoelastic rubber and has a sheet shape or a columnar shape. Each elastic supporting member 7 and each elastic supporting member 8 may be a damper comprising a bag formed of a flexible material, such as rubber, and which is filled with a fluid such as air or a liquid. The driving unit 10 is elastically supported by the elastic supporting members 7 and the elastic supporting members 8 so as to be movable leftward, rightward, upward, downward, forward, or backward within a range of approximately 0.1 to 2 mm.

The driving unit 10 comprises a hard case portion 11 which is thin and has a cubic shape. The hard case portion 11 is formed by bending a nonmagnetic metallic plate, or by using synthetic resin. A pair of protrusions (locks) 18 are spaced apart in the forward-and-backward directions and fixed to one of the side surfaces of the hard case portion 11. Similarly, a pair of protrusions 18 are spaced apart in the forward-and-backward directions and fixed to the other side surface of the hard case portion 11.

A hard disk 12, which is a magnetic disk, and a rotary driver 13, such as a spindle motor, for rotationally driving the hard disk 12 are disposed in the hard case portion 11. In the driving unit 10, the hard disk 12 in the hard case portion 11 cannot be replaced and is rotationally driven in a closed space in the hard case portion 11.

A magnetic head unit 14 is installed in the hard case portion 11. The magnetic head unit 14 comprises a magnetic head chip 14a opposing a magnetic recording surface of the hard disk 12, a load beam 14b for applying a predetermined load pressure to the magnetic head chip 14a, and an access actuator 14c for rotating the load beam 14b around a shaft 14d.

The magnetic head chip 14a comprises a slider opposing the magnetic recording surface of the hard disk 12, a reading unit comprising a magnetoresistive element mounted to the slider, and a writing unit comprising a thin-film inductive head. In recording digital signals onto the hard disk 12, or in reproducing the digital signals from the hard disk 12, the magnetic head chip 14a floats slightly through an air bearing at the surface of the hard disk 12 rotating at a high speed. Then, the load beam 14b is rotated by the access actuator 14c, so that the magnetic head chip 14a searches for a sector on the magnetic recording surface of the hard disk 12, and the reading unit or the writing unit performs a tracking operation in order to read or write the signals.

A circuit board (not shown) is mounted in the hard case portion 11, and has various circuits mounted thereto. The various circuits include a control circuit for controlling a driving operation of the rotary driver 13; a control circuit for controlling the operation of the magnetic head unit 14; a digital signal processing circuit for, for example, formatting a write signal and deformatting a read signal; and an interface circuit.

A connector 16 is installed in the connector case portion 4. Each terminal of the connector 16 and each of the circuits in the driving unit 10 are in electrical conduction through an electrically conductive pattern on a flexible printed circuit board 17. The flexible printed circuit board 17 is in a slightly flexed state, and can allow the driving unit 10 to move in the magnetic disk device 1. The flexible printed circuit board 17 also operates as an elastic supporting member for elastically supporting the driving unit 10 in the case C.

A groove 21 is continuously formed in the forward-and-backward-directions from the left surface of the connector case portion 4 to the outer side of the left surface 2b of the lower case portion 2. A slit 22 passing through the left surface 2b of the lower case portion 2 and extending in the forward-and-backward directions is opens in the groove 21. Similarly, a groove 21 and a slit 22 are also formed in the right surface of the connector case portion 4 and in the right surface 2c of the lower case portion 2.

A locking member 23 is disposed at the inner side of the left surface 2b of the lower case portion 2. The locking member 23 is supported by guide means (not shown) so as to be movable towards the front and back along the left surface 2b. A switching protrusion 23a is integrally formed with the outer surface of the locking member 23, and is exposed in the groove 21 through the slit 22. The slit 22 is wider than the switching protrusion 23a in the forward-and-backward directions, so that the switching protrusion 23a can slide in the slit 22 in the forward-and-backward directions. Therefore, when a user moves the switching protrusion 23a with his/her finger towards the front or the back, the locking member 23 slides towards the front or the back in the case C.

Lock grooves 23b that are spaced apart in the forward-and-backward directions are formed in the locking member 23. Each lock groove 23b has a recess which opens at the back. The lock grooves 23b oppose the protrusions (locks) 18 protruding from the associated left surface of the driving unit 10. Similarly, a locking member 23 which moves in the forward-and-backward directions is also formed at the inner side of the right surface 2c of the lower case portion 2. This locking member 23 also has a switching protrusion 23a and lock grooves 23b. Although in this embodiment the two locking members 23 operate separately, it is desirable that the locking members 23 both move together in the forward-and-backward directions by integrally connecting both of the locking members 23.

Figure 2:
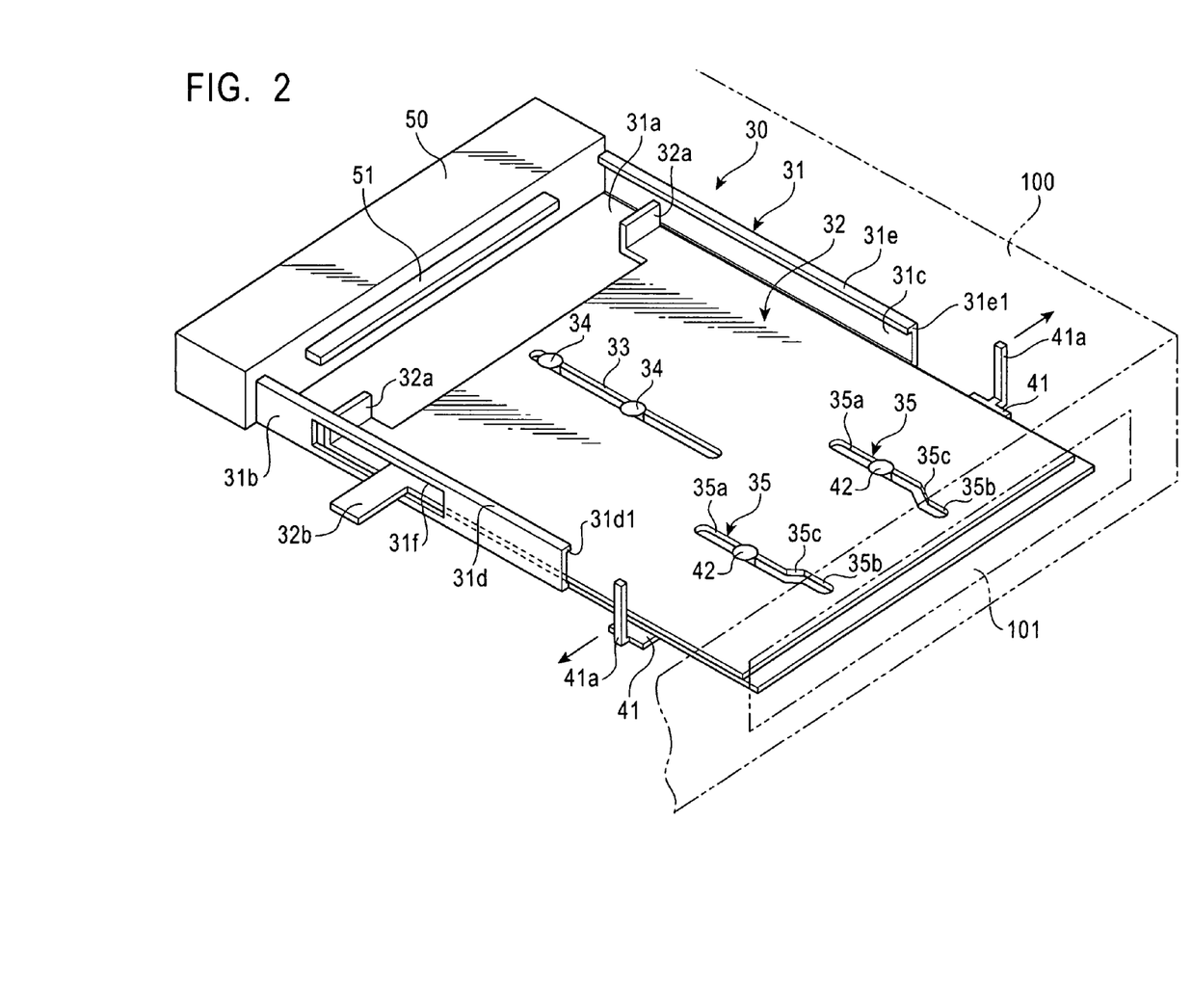
FIG. 2 is a perspective view showing a state of a mounting portion of the body of an electronic apparatus when the magnetic disk device is not mounted according to an embodiment of the present invention.
Figure 3:
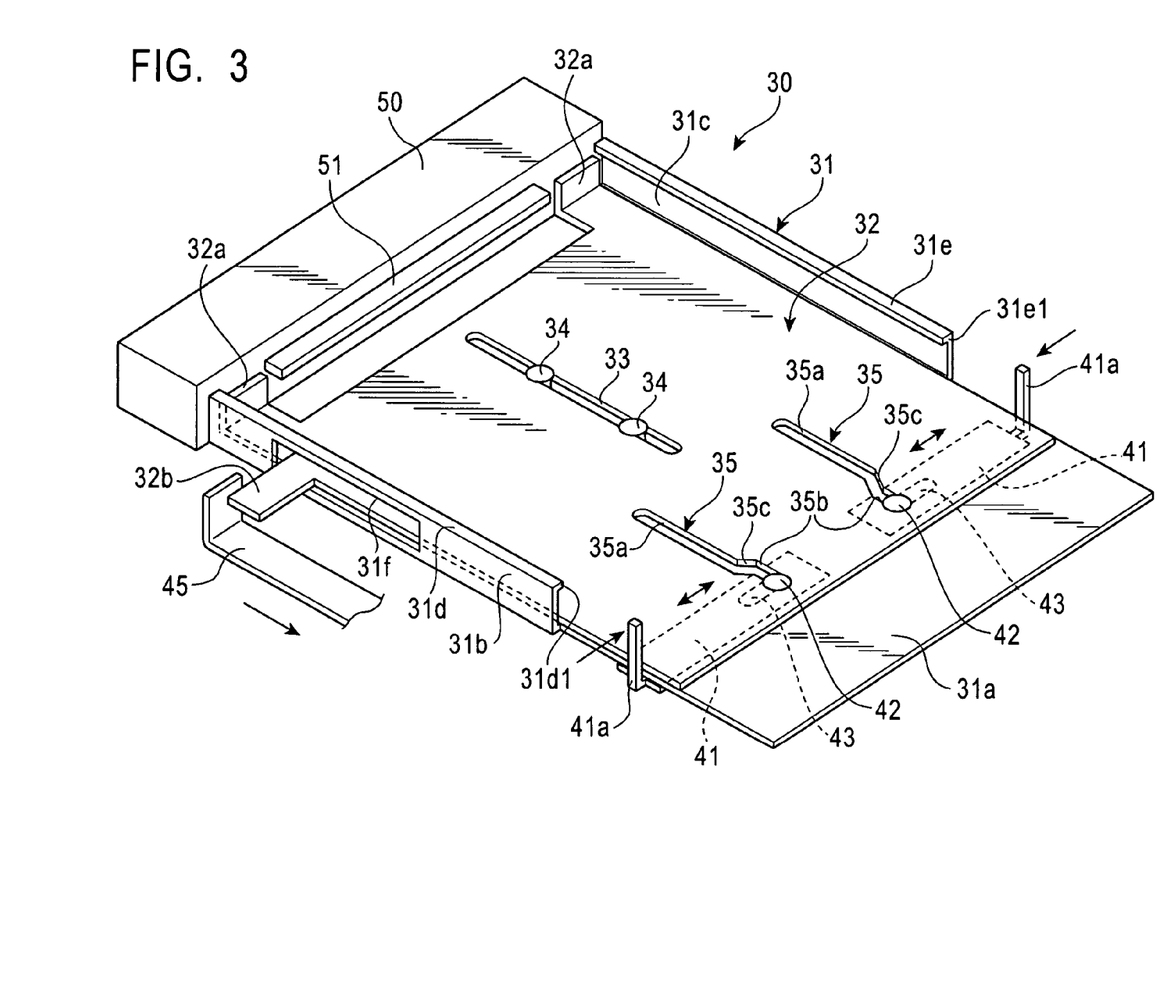
FIG. 3 is a perspective view showing a state of the mounting portion of the body of the electronic apparatus when the magnetic disk device is mounted according to an embodiment of the present invention.

FIGS. 2 and 3 illustrate a mounting portion 30 in an apparatus body 100 for removably mounting the above-described magnetic disk device 1.

The mounting portion 30 comprises a mounting frame 31. The mounting frame 31 is formed by bending a metallic plate, and comprises a bottom plate 31a, a left plate 31b, and a right plate 31c. An engager 31d is formed by bending the top end portion of the left plate 31b inward, and an engager 31e is formed by bending the top end portion of the right plate 31c inward. The engager 31d moves into the groove 21 in the left surface 2b of the magnetic disk device 1, and the engager 31e moves into the groove 21 in the right surface 2c of the magnetic disk device 1. The rear end of the engager 31d and the rear end of the engager 31e are formed as a first engager portion 31d1 and a first engager portion 31e1, respectively.

A flat sliding member 32 is disposed on the bottom plate 31a. A guide slot 33 extending in a straight line in forward and backward is formed in the sliding member 32. The sliding member 32 is slidable in the forward and backward by guiding the guide slot 33 by guide protrusions 34 secured to the bottom plate 31a. The left and right front end portions of the sliding member 32 are bent upwards at right angles to form contacts 32a.

A pair of switching holes 35 that are spaced apart are formed, one at the right ride and one at the left side of the rear portion of the sliding member 32. Each switching hole 35 comprises a non-engaging switching portion 35a, an engaging switching portion 35b, and an inclined portion 35c. The non-engaging switching portions 35a oppose each other with a certain distance therebetween and extend parallel to each other in the forward-and-backward directions. The engaging switching portions 35b are disposed behind the non-engaging switching portions 35a, oppose each other with a distance therebetween that is smaller than the certain distance, and extend parallel to each other in the forward-and-backward directions. The inclined portions 35c connect the corresponding non-engaging switching portions 35a and the corresponding engaging switching portions 35b.

As shown in FIG. 3, a pair of engaging plates 41 are disposed at the lower surface of the bottom plate 31a. The engaging plates 41 are guided by a guide mechanism (not shown) and are supported so as to be slidable in the forward-and-backward directions and in the leftward-and-rightward directions perpendicular thereto. Sliding protrusions 42 are secured to the respective engaging plates 41, and are inserted in the respective switching holes 35 of the sliding member 32 through respective guide holes 43 (see FIG. 3) that are formed in a straight line towards the left and right in the bottom plate 31a.

Engagers 41a which are formed at right angles are integrally formed with ends of the respective engaging plates 41, and operate as second engager portions.

In this embodiment, the first engager portions 31d1 and 31e1 operate as first switching portions that allow the locking members 23 to move backward relative to the case C in the magnetic disk device 1 and reach lock positions.

The engagers 41a, which are second engager portions operate as second switching portions which allow the locking members 23 to move forward relative to the case C and reach unlock positions. As described later, by the first switching portions and the second switching portions, the locking members 23 move from the unlock positions to the lock positions when the magnetic disk device 1 is inserted into the apparatus body 100, whereas the locking members 23 move from the lock positions to the unlock positions when the magnetic disk device 1 is removed from the apparatus body 100.

The engaging plates 41, the sliding protrusions 42, and the switching holes 35 formed in the sliding member 32 operate as a switching setting mechanism for engaging the engagers 41a, which are second engager portions, with the respective locking members 23 by moving the engagers 41a towards each other, and for disengaging the engager portions 41a from the respective locking members 23 by moving the engager portions 41a and 41a away from each other.

As shown in FIG. 3, a slot 3 If extending in the forward-and-backward directions is formed in the left plate 31b. A protrusion 32b is integrally formed with the sliding member 32, and protrudes towards the left and outwards from the slot 31f. An ejector 45 for pushing the protrusion 32b backwards is disposed at the outer side of the left plate 31b. It is desirable that the sliding member 32 be biased backwards by a weak spring material as shown in FIG. 2.

A body connector 50 is disposed in front of the mounting frame 31. A fitting portion 51 of the body connector 50 faces backward.

Next, the mounting of the magnetic disk device 1 will be described.

Figure 4A:
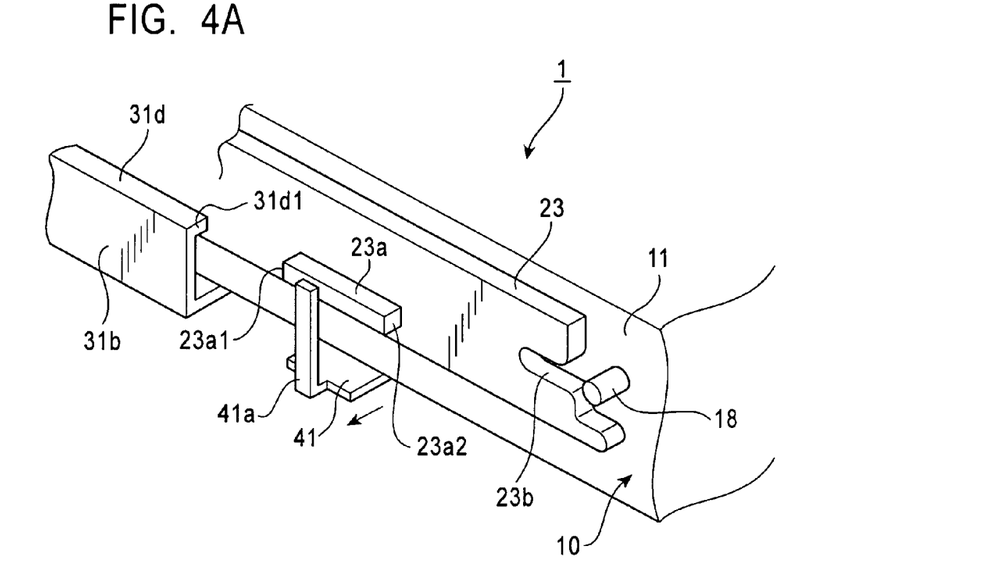
FIGS. 4A and 4B are partial enlarged perspective views illustrating a locking member in an unlocked position and a locked position, respectively.
Figure 4B:
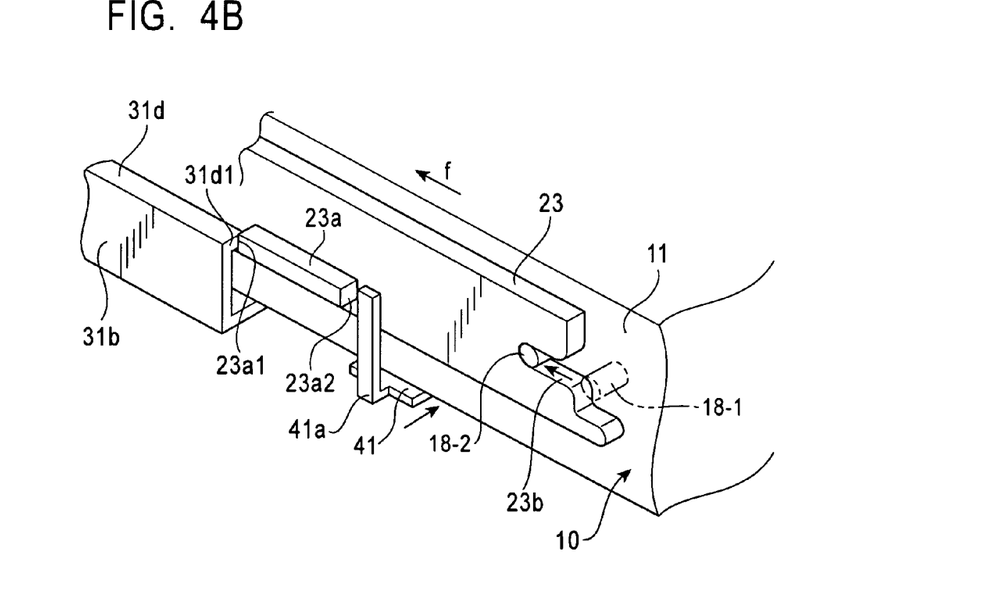

FIGS. 4A and 4B are partial perspective views for describing the mounting of the magnetic disk device 1. Here, the lower case portion 2 of the magnetic disk device 1, the sliding member 32 disposed at the mounting portion 30, etc. are not shown. The relationship between the driving unit 10 and the locking member 23 in the magnetic disk device 1 is only illustrated. In the mounting portion 30, the operations of the first engager portion 31d1 and the engager 41a are only described. Since the operation of the locking member 23 disposed at the right surface 2c of the lower case portion 2 is the same as the operation of the locking member 23 shown in FIGS. 4A and 4B, only the operation of the locking member 23 at the left surface 2b will be described.

When the magnetic disk device 1 is not mounted to the mounting portion 30 of the apparatus body 100, and before the magnetic disk device 1 is completely mounted to the mounting portion 30, in the magnetic disk device 1, as shown in FIG. 4A, the locking member 23 is at the unlock position which it reaches by moving forward, and the protrusions (locks) 18 are not inserted in the respective lock grooves 23b of the locking member 23. Therefore, in the case C of the magnetic disk device 1, the driving unit 10 is elastically supported by the elastic supporting members 7 and the elastic supporting members 8.

A structure for increasing the sliding load of the locking member 23 with the locking member 23 and a sliding plate spring (not shown) being fixed in the lower case portion 2 may be used as means for stabilizing the locking member 23 at the unlock position shown in FIG. 4A when the magnetic disk device 1 is not mounted to the mounting portion 30. It is desirable to use a structure for stabilizing the locking member 23 at the unlock position by biasing the locking member 23 by biasing force of a biasing member, such as a pulling force of a pulling coil spring S (see FIG. 1) or a pushing force of a compression coil spring, in the forward direction (that is, in the direction f in FIG. 4B).

When the magnetic disk device 1 is not mounted to the mounting portion 30 of the apparatus body 100, the driving unit 10 in the case C is elastically supported by the elastic supporting members 7 and the elastic supporting members 8 without being locked by the locking member 23. Therefore, even if a large shock is accidentally applied to the magnetic disk device 1, it is possible to prevent an excessive shock from being directly applied to the driving unit 10. Consequently, it is possible to prevent a surface of the hard disk 12 from becoming damaged due to collision with the magnetic head chip 14a, or to prevent the magnetic head chip 14a from becoming damaged.

When the magnetic disk device 1 is not mounted to the apparatus body 100, as shown in FIG. 2, the sliding member 32 is moved back in the mounting portion 30. At this time, since the sliding protrusions 42 at the respective engaging plates 41 are positioned in the non-engaging switching portions 35a of the respective switching holes 35 in the sliding member 32, the engaging plates 41 are moved outwards to the left and right, respectively, and are disposed away from each other. Therefore, when the magnetic disk device 1 is mounted to the mounting portion 30, the engagers 41a will not prevent insertion of the magnetic disk device 1.

The magnetic disk device 1 having its connector case portion 4 faced forward is inserted into the mounting portion 30 from an insertion opening 101 of the apparatus body 100 shown in FIG. 2. In the insertion of the magnetic disk device 1, the engager 31d bent at the left plate 31b and the engager 31e bent at the right plate 31c move into the groove 21 in the left surface 2b and the groove 21 in the right surface 2c of the lower case portion 2 shown in FIG. 1, respectively. While being guided by the engagers 31d and 31e, the magnetic disk device 1 is inserted. Accordingly, the engagers 31d and 31e function as guide members when mounting the magnetic disk device 1 to or ejecting it from the mounting portion 30.

When the magnetic disk device 1 is inserted, and the front surface of the connector case portion 4 strikes the contacts 32a of the sliding member 32 shown in FIG. 2, the sliding member 32 thereafter moves forward along with the magnetic disk device 1 by the force that is generated by the insertion of the magnetic disk device 1.

When a front end 23a1 of the switching protrusion 23a protruding in the groove 21 in the left surface 2b of the magnetic disk device 1 contacts the first engager portion 31d1 at the rear end of the engager 31d, or immediately before or after the contact, as shown in FIG. 3, the sliding protrusions 42 move into the engaging switching portions 35b of the respective switching holes 35 in the sliding member 32, so that the engaging plates 41 move towards each other. Therefore, as shown in FIG. 4B, after the switching protrusion 23a on the locking member 23 has moved forward along the inner side of the engager 41a, when the front end 23a1 contacts the first engager portion 31d1 or immediately before or after the contact, the engager 41a moves into a vertical groove 21a in the left surface 2b shown in FIG. 1, and opposes a rear end 23a2 of the switching protrusion 23a with a slight gap therebetween.

When the magnetic disk device 1 is further inserted into the apparatus body 100 towards the body connector 50, the whole magnetic disk device 1 moves forward while the switching protrusion 23a on the locking member 23 engaging the first engager portion 31d1 does not move. Therefore, as shown in FIG. 4B, the protrusion 18 on the driving unit 10 moves from a position 18-1 to a position 18-2 where it is inserted in the lock groove 23b. In other words, in the magnetic disk device 1, the locking member 23 moves backward relative to the case C and reaches the lock position where the driving unit 10 is locked in the case C. The front end of the connector 16 at the front portion of the driving unit 10 is fitted to the body connector 50.

Therefore, with the magnetic disk device 1 being mounted to the mounting portion 30, the driving unit 10 is secured, and recording and reproducing of information are carried out in the magnetic disk device 1. Here, with the driving unit 10 being locked by the locking member 23 in the case C, the hard disk 12 is rotationally driven to operate the magnetic head unit 14. Therefore, it is possible to prevent, for example, the recording surface of the hard disk 12 from becoming scratched or the magnetic head chip 14a from becoming damaged when the hard disk 12 or the magnetic head unit 14 is inadvertently moved due to, for example, vibration.

When the magnetic disk device 1 is ejected from the apparatus body 100, the ejector 45 shown in FIG. 3 is moved backward, for example, by direct operation of the ejector 45 by the user, or by motor power. At this time, the ejector 45 pushes the protrusion 32b backward, causing the sliding member 32 to slide backward. The contacts 32a of the sliding member 32 push back the magnetic disk device 1 along with the sliding member 32, so that the connector 16 of the magnetic disk device 1 is separated from the body connector 50.

At this time, the magnetic disk device 1 moves backward while the locking member 23 is stopped by the engagement of the rear end 23a2 of the switching protrusion 23a of the locking member 23 with the engager 41a. Therefore, the protrusion 18 moves from the position 18-2 to the position 18-1 shown in FIG. 4B, and moves out of the lock groove 23b in the locking member 23, so that the driving unit 10 is elastically supported by the elastic supporting members 7 and the elastic supporting members 8 in the case C. In other words, in the magnetic disk device 1, the locking member 23 moves forward relative to the case C and reaches the unlock position.

Backward movement of the sliding member 32 immediately after the protrusion 18 has moved out of the lock groove 23b causes the sliding protrusions 42 to move into the non-engaging switching portions 35a of the respective switching holes 35. This causes the engaging plates 41 to move towards the left and right, respectively, so that the engagers 41a move away from their respective switching protrusions 23a. By this, the magnetic disk device 1 can be removed from the mounting portion 30. That is, the magnetic disk device 1 can be removed from the insertion opening 101 of the apparatus body 100.

The present invention is not limited to the above-described embodiment. Rather, various modifications can be made.

For example, in the magnetic disk device 1, when the magnetic disk device 1 is not mounted to the mounting portion 30, if the locking member 23 is stabilized at the unlock position by the biasing force of the biasing member, such as the pulling coil spring S or the compression coil spring, in the direction in which the protrusion 18 moves out of the lock groove 23b (that is, the direction f in FIG. 4B), the engager (second engager portion) 41a does not necessarily have to be used.

In this case, if the first engager portions 31d1 and 31e1 are provided, while the magnetic disk device 1 is being inserted into the mounting portion 30, the front end 23a1 of the switching protrusion 23a and a front end 23a1 of the switching protrusion 23a strike the first engager portions 31d1 and 31e1, respectively. Thereafter, by the force produced by inserting the magnetic disk device 1, the locking members 23 are moved to the lock positions against the biasing force of the corresponding biasing member and that of a corresponding biasing member in the magnetic disk device 1. Then, when the magnetic disk device 1 is removed from the mounting portion 30, the locking members 23 automatically move to the unlock positions by the biasing force of the biasing members.

In this case, it is desirable to provide, for example, a pushing member for holding down the rear surface 2d of the mounted magnetic disk device 1 so that, while the magnetic disk device 1 is mounted to the mounting portion 30, the magnetic disk device 1 is prevented from moving away from the body connector due to opposing force of the biasing members which bias the respective locking members 23.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A magnetic disk device removable from an apparatus body, the magnetic disk device comprising:
   a case;
   a driving unit including a magnetic disk and a rotary driver operable to rotationally drive a magnetic disk, wherein the driving unit is installed in the case;
   an elastic supporting member disposed between the case and the driving unit;
   a locking member movably mounted in the case; and
   a connector for connecting the driving unit and the apparatus body;
   wherein the elastic supporting member is operable to elastically support the driving unit, force applied to the external of the case is operable to move the locking member to a locked position and an unlocked position, the driving unit is locked in the case when the locking member is in the locked position and unlocked in the case when the locking member is in the unlocked position, and the connector is operable to connect to the apparatus body when the locking member is in the locked position.

2. The magnetic disk device of claim 1, wherein a front portion corresponds to a side of the magnetic disk device in which the connector is disposed and a rear portion corresponds to the side opposite to the front portion, the locking member reaches the unlocked position by moving towards the front portion of the magnetic disk device relative to the case, and the locking member reaches the locked position by moving towards the rear portion of the magnetic disk device relative to the case.

3. The magnetic disk device of claim 2, wherein the locking member is disposed at an inner side of the case, and has a switching protrusion exposed at an outer surface of the case that may be accessed from the exterior of the case.

4. The magnetic disk device of claim 3, wherein a side surface of the case has a slit, the locking member is movable toward and away from the front portion of the magnetic disk device, and the switching protrusion on the locking member is located in the slit.

5. The magnetic disk device of claim 4, wherein the side surface of the case has a groove extending forward and backward, and the slit opens in the groove.

6. The magnetic disk device of claim 1, wherein the locking member is biased by a biasing member in the direction of the unlocked position.

7. The magnetic disk device of claim 1, further comprising:
a body connector coupled with the connector;
a switching protrusion coupled with the locking member;
a first engager operable to engage a first end of the switching protrusion;
a second engager operable to engage a second end of the switching protrusion;
wherein the locking member is in the locked position when the first engager is engaged with the first end of the switching protrusion and the second engager is engaged against the second end of the switching protrusion.

8. The magnetic disk device of claim 1, wherein the case is operative to be inserted into the apparatus body with the driving unit.

9. An apparatus comprising:
a body for removably mounting a magnetic disk device;
the magnetic disk device comprising a case, a driving unit, and a connector;
the driving unit including a magnetic disk and a rotary driver operable to rotationally drive the magnetic disk, and being installed in the case;
the connector operable to connect the driving unit to the body;
the case including an elastic supporting member and a locking member;
the elastic supporting member disposed between the case and the driving unit and operable to elastically support the driving unit;
the locking member movably mounted in the case and operable to move to a locked position and an unlocked position; and
the body comprising a body connector operable to connect with the connector of the magnetic disk device, and a switching unit operable to move the locking member to the locked position;
wherein the driving unit is locked in the case when the locking member is in the locked position and unlocked in the case when the locking member is in the unlocked position, and the connector is operable to connect to the apparatus when the locking member is in the locked position.

10. The apparatus of claim 9, wherein the locking member is coupled with a biasing member.

11. The apparatus of claim 10, wherein the switching unit comprises a first engager and a second engager, the first engager engages the locking member in order to move the locking member to the lock position by force for inserting the magnetic disk device when the front portion of the magnetic disk device is inserted into the body connector, and the second engager engages the locking member in order to move the locking member to the unlock position by force for removing the magnetic disk device when the magnetic disk device is removed.

12. The apparatus of claim 11, wherein the body further comprises a switching setting mechanism operable to respond to the insertion of the magnetic disk device and engage the second engager to the locking member when the magnetic disk device is inserted.

13. The apparatus of claim 12, wherein the switching setting mechanism is operable to move the second engager away from the magnetic disk device after the second engager allows the locking member to move to the unlocked position when the magnetic disk device is removed.

14. The apparatus of claim 13, wherein the switching setting mechanism comprises a sliding member and an engaging member, the sliding member coupled with the magnetic disk device and moving with the magnetic disk device when the magnetic disk device is inserted, the engaging member moving in response to the movement of the sliding member in a direction perpendicular to the direction of movement of the sliding member.

15. The apparatus of claim 14, wherein the second engager is integrated with the engaging member.

16. The apparatus of claim 9, wherein the locking member is disposed at an inner side of the case, and includes a switching protrusion operable from the exterior of the case.

17. The apparatus of claim 16, wherein a side surface of the case includes a slit, the locking member is movable toward and away from a front portion of the magnetic disk device, and the switching protrusion on the locking member is located in the slit.

18. The apparatus of claim 17, wherein the side surface of the case has a groove extending forward and backward, and the slit opens in the groove.

19. The apparatus of claim 9, wherein the case is operative to be inserted into the apparatus with the driving unit.

20. A magnetic disk device removable from an apparatus body, the magnetic disk device comprising:
a case including an upper case portion, a lower case portion, and a connector portion;
at least one first elastic supporting member connected with the lower case portion;
a locking member connected with the lower case portion;
at least one second elastic supporting member connected with the upper case portion;
a driving unit including a magnetic disk and a rotary driver operable to rotationally drive a magnetic disk, wherein the driving unit is installed in the case; and
a connector for connecting the driving unit and the apparatus body, the connector located in the connector portion;
wherein the first and second elastic supporting members are operable to elastically support the driving unit, force applied to the external of the case is operable to move the locking member to a locked position and an unlocked position, the driving unit is locked in the case when the locking member is in the locked position and unlocked in the case when the locking member is in the unlocked position, and the connector is operable to connect to the apparatus body when the locking member is in the locked position.

21. The magnetic disk device of claim 20, wherein a front portion corresponds to a side of the magnetic disk device in which the connector is disposed and a rear portion corresponds to the side opposite to the front portion, the locking member reaches the unlocked position by moving towards the front portion of the magnetic disk device relative to the case, and the locking member reaches the locked position by moving towards the rear portion of the magnetic disk device relative to the case.

22. The magnetic disk device of claim 21, wherein the locking member is disposed at an inner side of the case, and has a switching protrusion exposed at an outer surface of the case that may be accessed from the exterior of the case.

23. The magnetic disk device of claim 22, wherein a side surface of the case has a slit, the locking member is movable toward and away from the front portion of the magnetic disk device, the switching protrusion on the locking member is located in the slit.

24. The magnetic disk device of claim 23, wherein the side surface of the case has a groove extending forward and backward, and the slit opens in the groove.

25. The magnetic disk device of claim 20, wherein the locking member is biased by a biasing member in the direction of the unlocked position.

26. The magnetic disk device of claim 20, further comprising:
- a body connector coupled with the connector;
- a switching protrusion coupled with the locking member;
- a mounting frame connected with the body connector, the mounting frame having a bottom plate, a left plate, and a right plate;
- a sliding member disposed between the left and right plates and above the bottom plate, the sliding member including at least one switching hole;
- a first engager formed from a bent portion of the left or right plate and operable to engage a first end of the switching protrusion;
- a second engager comprising a flat portion located below the bottom plate and at least one sliding protrusion located in the at least one switching hole and operable to engage a second end of the switching protrusion;
- wherein the locking member is in the locked position when the first engager is engaged with the first end of the switching protrusion and the second engager is engaged against the second end of the switching protrusion.

27. The magnetic disk device of claim 20, wherein the case is operative to be inserted into the apparatus body with the driving unit.

* * * * *